United States Patent
Lee et al.

(10) Patent No.: US 11,586,543 B2
(45) Date of Patent: Feb. 21, 2023

(54) SYSTEM, DEVICE AND METHOD FOR ACCESSING DEVICE-ATTACHED MEMORY

(71) Applicant: SAMSUNG ELECTRONICS CO., LTD., Suwon-si (KR)

(72) Inventors: Jeongho Lee, Gwacheon-si (KR); Heehyun Nam, Seoul (KR); Jaeho Shin, Gwangmyeong-si (KR); Hyodeok Shin, Seoul (KR); Younggeon Yoo, Seoul (KR); Younho Jeon, Gimhae-si (KR); Wonseb Jeong, Hwaseong-si (KR); Ipoom Jeong, Hwaseong-si (KR); Hyeokjun Choe, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/380,805

(22) Filed: Jul. 20, 2021

(65) Prior Publication Data

US 2022/0121574 A1   Apr. 21, 2022

(30) Foreign Application Priority Data

Oct. 15, 2020  (KR) .................. 10-2020-0133743

(51) Int. Cl.
  *G06F 12/00*   (2006.01)
  *G06F 12/0817*  (2016.01)
  *G06F 3/06*    (2006.01)
  *G06F 12/0862*  (2016.01)

(52) U.S. Cl.
  CPC ........ *G06F 12/0828* (2013.01); *G06F 3/0622* (2013.01); *G06F 3/0655* (2013.01); *G06F 3/0679* (2013.01); *G06F 12/0862* (2013.01); *G06F 2212/602* (2013.01); *G06F 2212/621* (2013.01)

(58) Field of Classification Search
  CPC .. G06F 12/0828; G06F 3/0622; G06F 3/0655; G06F 3/0679; G06F 12/0862; G06F 2212/602; G06F 2212/621
  See application file for complete search history.

(56) References Cited

U.S. PATENT DOCUMENTS

| | | | |
|---|---|---|---|
| 7,058,767 B2 | 6/2006 | Dodson et al. |
| 7,490,184 B2 | 2/2009 | Srinivasan |
| 7,600,078 B1 | 10/2009 | Cen et al. |
| 7,814,279 B2 | 10/2010 | Clark et al. |
| 10,671,307 B2 | 6/2020 | Lee et al. |
| 2005/0154836 A1 | 7/2005 | Steely et al. |

(Continued)

FOREIGN PATENT DOCUMENTS

KR  10-2018-0133730 A  12/2018

OTHER PUBLICATIONS

Communication dated Jan. 5, 2022 by the European Patent Office in European Patent Application No. 21187164.5.

*Primary Examiner* — Gurtej Bansal
(74) *Attorney, Agent, or Firm* — Sughrue Mion, PLLC

(57) ABSTRACT

A device connected to a host processor via a bus includes: an accelerator circuit configured to operate based on a message received from the host processor; and a controller configured to control an access to a memory connected to the device, wherein the controller is further configured to, in response to a read request received from the accelerator circuit, provide a first message requesting resolution of coherence to the host processor and prefetch first data from the memory.

20 Claims, 16 Drawing Sheets

(56) References Cited

U.S. PATENT DOCUMENTS

| | | |
|---|---|---|
| 2007/0226422 A1 | 9/2007 | Mino et al. |
| 2009/0106498 A1 | 4/2009 | Lepak et al. |
| 2019/0065426 A1 | 2/2019 | Das Sharma et al. |
| 2019/0102311 A1 | 4/2019 | Gupta et al. |
| 2020/0012604 A1 | 1/2020 | Agarwal |

US 11,586,543 B2

SYSTEM, DEVICE AND METHOD FOR ACCESSING DEVICE-ATTACHED MEMORY

CROSS-REFERENCE TO RELATED APPLICATION

This application is based on and claims priority under 35 U.S.C. § 119 to Korean Patent Application No. 10-2020-0133743, filed on Oct. 15, 2020, in the Korean Intellectual Property Office, the disclosure of which is incorporated by reference herein in its entirety.

BACKGROUND

Example embodiments are related to a memory access, and more particularly, to a system, a device, and a method for accessing a device-attached memory.

An apparatus configured to process data may perform various operations by accessing a memory. For example, an apparatus may process data read from a memory or write processed data in the memory. According to the performance and functions required from a system, various apparatuses, which communicate with each other through a link configured to provide a high bandwidth and a low latency, may be included in the system. A memory included in the system may be shared and accessed by two or more apparatuses. Accordingly, the performance of the system may depend on not only an operating speed of each of the apparatuses but also the communication efficiency among the apparatuses and a time taken to access the memory.

SUMMARY

Example embodiments provide a system, a device, and a method for a reduced latency of a memory access.

According to an aspect of an example embodiment, there is provided a device connected to a host processor via a bus, the device including an accelerator circuit configured to operate based on a message received from the host processor; and a controller configured to control an access to a memory connected to the device, wherein the controller is further configured to, in response to a read request received from the accelerator circuit, provide a first message requesting resolution of coherence to the host processor and prefetch first data from the memory.

According to an aspect of an example embodiment, there is provided a system including a host processor including at least one core configured to execute instructions; a device connected to the host processor via a bus and configured to be set to a host bias mode or a device bias mode; and a memory connected to the device and configured to be accessed by the host processor through the device, wherein the device is further configured to, in the host bias mode, provide a first message for requesting resolution of coherence to the host processor and prefetch first data from the memory before receiving, from the host processor, a second message indicating completion of the resolution of coherence.

According to an aspect of an example embodiment, there is provided a method of operating a device connected to a host processor via a bus, the method including setting a host bias mode as a mode for accessing a memory connected to the device; providing, to the host processor via the bus, a first message requesting a resolution of coherence on a region in the memory corresponding to an address; prefetching first data from the region in the memory based on the address; and receiving, from the host processor via the bus, a second message indicating completion of the resolution of coherence on the region in the memory, wherein the prefetching of the first data starts before the receiving of the second message.

BRIEF DESCRIPTION OF THE DRAWINGS

Example embodiments will be more clearly understood from the following detailed description taken in conjunction with the accompanying drawings in which.

DETAILED DESCRIPTION

Figure 1:
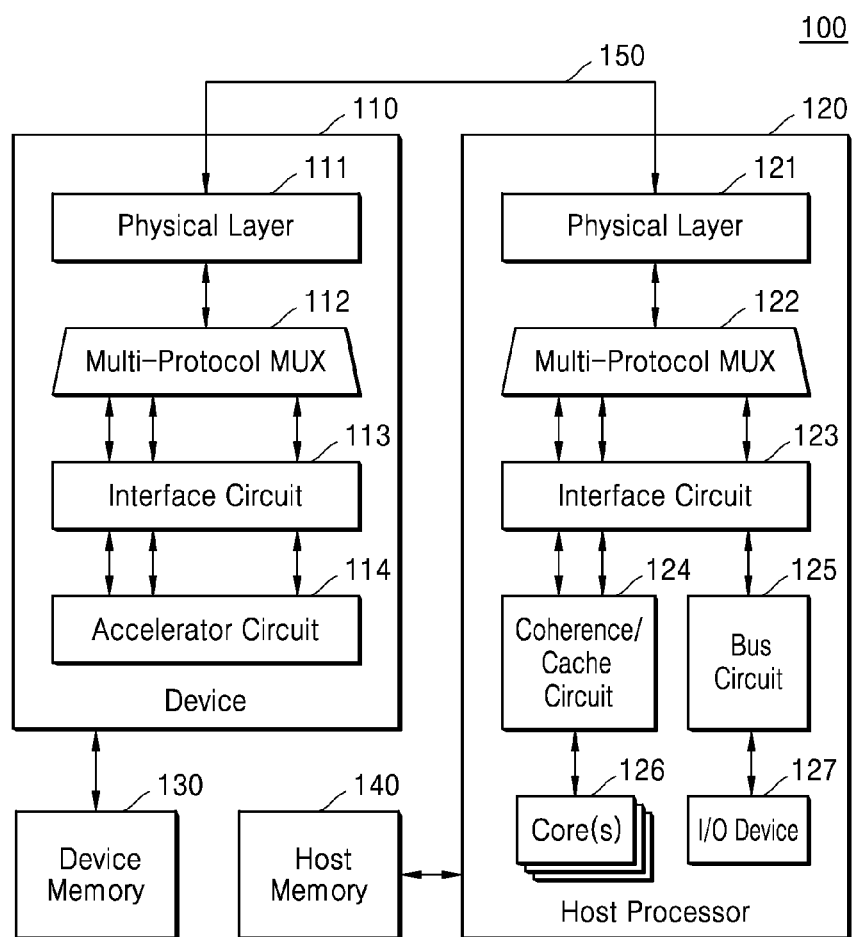
FIG. 1 is a block diagram of a system according to an example embodiment.

FIG. 1 is a block diagram of a system 100 according to an example embodiment. The system 100 may be an arbitrary computing system (or a component included in the computing system) including a device 110 and a host processor 120, which communicate with each other. For example, the system 100 may be included in a stationary computing system such as a desktop computer, a server, or a kiosk or a portable computing system such as a laptop computer, a mobile phone, or a wearable device. In addition, in some embodiments, the system 100 may be included in a system-on-chip (SoC) or a system-in-package (SiP) in which the device 110 and the host processor 120 are implemented in a single chip or package. As shown in FIG. 1, the system 100 may include the device 110, the host processor 120, a device memory 130, and a host memory 140.

Referring to FIG. 1, the device 110 and the host processor 120 may communicate with each other via a link 150 and transmit or receive a message and/or data therebetween via the link 150. Although example embodiments of the disclosure will be described with reference to the link 150 based on a compute express link (CXL) specification supporting CXL protocols, the device 110 and the host processor 120 may communicate with each other based on, as non-limited examples, coherent interconnect technologies such as an XBus protocol, an NVLink protocol, an infinity fabric protocol, a cache coherent interconnect for accelerators (CCIX) protocol, and a coherent accelerator processor interface (CAPI).

In some embodiments, the link 150 may support multiple protocols, and a message and/or data may be transmitted through the multiple protocols. For example, the link 150 may support CXL protocols including a non-coherent protocol (e.g., CXL.io), a coherent protocol (e.g., CXL.cache), and a memory access protocol (or a memory protocol) (e.g., CXL.mem). In some embodiments, the link 150 may support, as non-limited examples, protocols such as peripheral component interconnect (PCI), PCI express (PCIe), universal serial bus (USB), and serial advanced technology attachment (SATA). Herein, a protocol supported by the link 150 may be referred to as an interconnect protocol.

The device 110 may indicate an arbitrary device for providing a useful function to the host processor 120, and correspond to an accelerator of the CXL specification in some embodiments. For example, software executed by the host processor 120 may offload at least a portion of a computing and/or input/output (I/O) task to the device 110. In some embodiments, the device 110 may include at least one of programmable components such as a graphics processing unit (GPU) and a neural processing unit (NPU), components configured to provide a fixed function, such as an intellectual property (IP) core, and reconfigurable components such as a field programmable gate array (FPGA). As shown in FIG. 1, the device 110 may include a physical layer 111, a multi-protocol multiplexer (MUX) 112, an interface circuit 113, and an accelerator circuit 114 and communicate with the device memory 130.

The accelerator circuit 114 may perform a useful function provided by the device 110 to the host processor 120 and may be referred to as an accelerator logic. As shown in FIG. 1, the accelerator circuit 114 may communicate with the host processor 120 through the interface circuit 113 by using the multiple protocols. The interface circuit 113 may determine one of the multiple protocols based on a message and/or data for communication between the accelerator circuit 114 and the host processor 120. The interface circuit 113 may be connected to at least one protocol queue included in the multi-protocol multiplexer 112 and give and take a message and/or data to and from the host processor 120 through the at least one protocol queue. In some embodiments, the interface circuit 113 and the multi-protocol multiplexer 112 may be integrated into one component. In some embodiments, the multi-protocol multiplexer 112 may include multiple protocol queues respectively corresponding to the multiple protocols supported by the link 150. In addition, in some embodiments, the multi-protocol multiplexer 112 may arbitrate between communications of different protocols and provide selected communications to the physical layer 111. In some embodiments, the physical layer 111 may be connected to a physical layer 121 in the host processor 120 by a single interconnect, a bus, a trace, or the like.

The device memory 130 may be connected to the device 110 as shown in FIG. 1 and be referred to as a device-attached memory. As shown in FIG. 1, when the device memory 130 is included in the system 100, the accelerator circuit 114 may communicate with the device memory 130 based on a protocol independent to the link 150, i.e., a device-specific protocol. In some embodiments, as described below with reference to FIGS. 2A and 2B, the device 110 may include a controller as a component configured to access the device memory 130, and the accelerator circuit 114 may access the device memory 130 through the controller. The controller may provide not only an access of the accelerator circuit 114 to the device memory 130 but also an access of the host processor 120 to the device memory 130 via the link 150. In some embodiments, the device memory 130 may correspond to a device-attached memory of the CXL specification.

The host processor 120 may be a main processor, e.g., a central processing unit (CPU), of the system 100, and in some embodiments, the host processor 120 may correspond to a host processor (or a host) of the CXL specification. As shown in FIG. 1, the host processor 120 may be connected to the host memory 140 and include the physical layer 121, a multi-protocol multiplexer (MUX) 122, an interface circuit 123, a coherence/cache circuit 124, a bus circuit 125, at least one core 126, and an I/O device 127.

The at least one core 126 may execute an instruction and may be connected to the coherence/cache circuit 124. The coherence/cache circuit 124 may include a cache hierarchy and may be referred to as a coherence/cache logic. As shown in FIG. 1, the coherence/cache circuit 124 may communicate with the least one core 126 and the interface circuit 123. For example, the coherence/cache circuit 124 may enable communication through two or more protocols including a coherent protocol and a memory access protocol. In some embodiments, the coherence/cache circuit 124 may include a direct memory access (DMA) circuit. The I/O device 127 may be used to communicate with the bus circuit 125. For example, the bus circuit 125 may be a PCIe logic, and the I/O device 127 may be a PCIe I/O device.

The interface circuit 123 may enable communication between components (e.g., the coherence/cache circuit 124 and the bus circuit 125) of the host processor 120 and the device 110. In some embodiments, the interface circuit 123 may enable communication of a message and/or data between components of the host processor 120 and the device 110 according to the multiple protocols, e.g., a non-coherent protocol, a coherent protocol, and a memory protocol. For example, the interface circuit 123 may determine one of the multiple protocols based on a message and/or data for communication between components of the host processor 120 and the device 110.

The multi-protocol multiplexer 122 may include at least one protocol queue. The interface circuit 123 may be connected to the at least one protocol queue and give and take a message and/or data to and from the device 110 through the at least one protocol queue. In some embodiments, the interface circuit 123 and the multi-protocol multiplexer 122 may be integrated into one component. In some embodiments, the multi-protocol multiplexer 122 may include multiple protocol queues respectively corresponding to the multiple protocols supported by the link 150. In addition, in some embodiments, the multi-protocol multiplexer 122 may arbitrate between communications of different protocols and provide selected communications to the physical layer 121.

The device 110 may have a performance depending on a bandwidth between the device 110 and the device memory 130, and accordingly, a massive bandwidth may be provided between the device 110 and the device memory 130. In addition, the host processor 120 may access the device memory 130 through the link 150 and the device 110. To optimize the performance of an access to the device memory 130, an access mode to the device memory 130 may be dynamically set. For example, as described below with reference to FIGS. 2A and 2B, a device bias mode may be set in a period in which the device memory 130 is mainly accessed by the device 110, and a host bias mode may be set in a period in which the device memory 130 is mainly accessed by the host processor 120.

To perform a task, the device 110 may write data in the device memory 130 or read data from the device memory 130 even in the host bias mode. To this end, as described below with reference to FIGS. 2A and 2B, the device 110 may be required in the host bias mode to give and take a message to and from the host processor 120 before accessing the device memory 130, and accordingly, the access of the device 110 to the device memory 130 in the host bias mode may be delayed. As described below with reference to the drawings, in a situation in which the device memory 130 is frequently accessed by the host processor 120, i.e., in the host bias mode, the device 110 may prefetch data from the device memory 130 in parallel to communication with the host processor 120, and accordingly, an access latency of the device 110 to the device memory 130 may be reduced. In addition, because of the reduced access latency of the device 110 to the device memory 130, not only the efficiency of a task performed by the device 110 but also the performance of the system 100 may be improved.

Figure 2A:
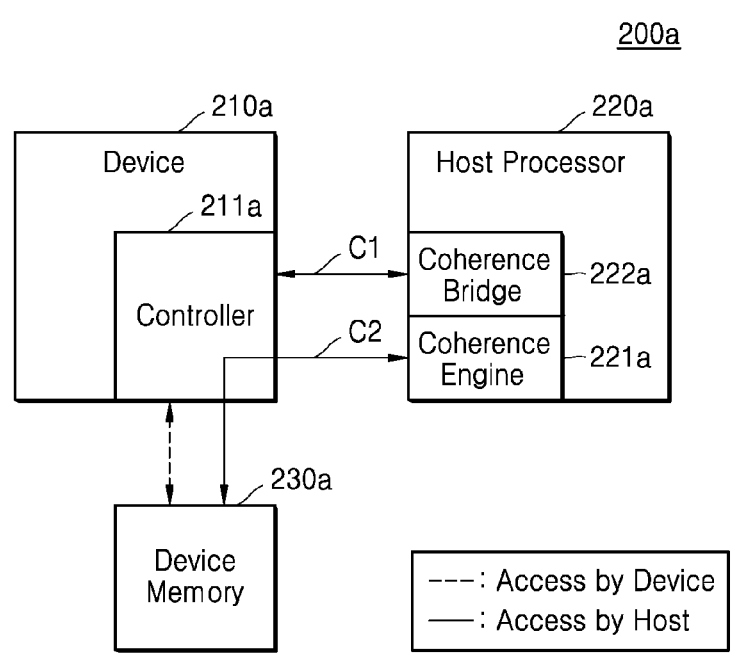
FIGS. 2A and 2B are block diagrams of examples of a system according to example embodiments.
Figure 2B:
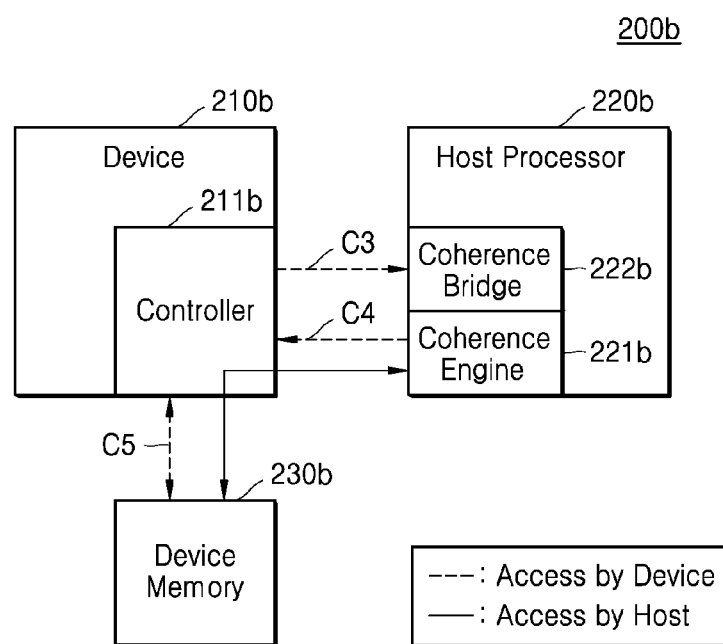

FIGS. 2A and 2B are block diagrams of examples of a system according to example embodiments. Particularly, the block diagram of FIG. 2A illustrates a system 200a set to the device bias mode as an access mode to a device memory 230a, and the block diagram of FIG. 2B illustrates a system 200b set to the host bias mode as an access mode to a device memory 230b. The device bias mode and the host bias mode may be switched between each other in an arbitrary manner, e.g., dynamically switched between each other based on software assistance and/or hardware autonomy of the CXL specification. In FIGS. 2A and 2B, the dashed arrow indicates communication for an access of a device 210a or 210b to the device memory 230a or 230b, and the solid arrow indicates communication for access of a host processor 220a or 220b to the device memory 230a or 230b. Hereinafter, descriptions previously given with respect to FIGS. 2A and 2B will be omitted.

Referring to FIG. 2A, the system 200a may include the device 210a, the host processor 220a, and the device memory 230a. The device 210a may include a controller 211a capable of communicating with the host processor 220a and the device memory 230a, and in some embodiments, the controller 211a may correspond to a data coherence engine (DCOH) of the CXL specification. Although not shown in FIG. 2A, the device 210a may further include a component (e.g., the accelerator circuit 114 of FIG. 1) configured to perform a function provided by the device 210a to the host processor 220a and access the device memory 230a through the controller 211a.

The host processor 220a may include a coherence bridge 222a and a coherence engine 221a. The coherence bridge 222a may communicate with the device 210a based on a coherent protocol (e.g., CXL.cache) defining interactions between the device 210a and the host processor 220a. For example, the coherence bridge 222a may receive a request (e.g., a D2H request), a response (e.g., a D2H response), and data (e.g., D2H data) from the device 210a and provide a request (e.g., an H2D request), a response (e.g., an H2D response), and data (e.g., H2D data) to the device 210a. The coherence engine 221a may communicate with the device 210a based on a memory protocol (e.g., CXL.mem) and resolve coherence for a given address. In some embodiments, the coherence engine 221a may correspond to a home agent of the CXL specification.

The device bias mode may be set for the efficiency of a task to be performed by the device 210a, and in the device bias mode, the device 210a may access the device memory 230a based on a high bandwidth and a low latency. For example, as marked with the dashed arrow in FIG. 2A, the controller 211a may access the device memory 230a without consulting with the coherence engine 221a in the host processor 220a. In addition, in the device bias mode, the host processor 220a may access the device memory 230a, but as marked with the solid arrow in FIG. 2A, the host processor 220a may access the device memory 230a by performing communication C1 with the device 210a and then performing communication C2 with the controller 211a.

Referring to FIG. 2B, the system 200b may include the device 210b, the host processor 220b, and the device memory 230b. The device 210b may include a controller 211b, and the host processor 220b may include a coherence bridge 222b and a coherence engine 221b. Although not shown in FIG. 2B, the device 210b may further include a component (e.g., the accelerator circuit 114 of FIG. 1) configured to perform a function provided by the device 210b to the host processor 220b and access the device memory 230b through the controller 211b.

The host bias mode may be set for the host processor 220b to access the device memory 230b, and in the host bias mode, an access of the device 210b to the device memory 230b may not be optimal. For example, the host bias mode may be set for the host processor 220b to push an input (e.g., an operand) for a task to be performed in the device 210b or to pull a result of a task performed by the device 210b. As marked with the solid arrow in FIG. 2B, the host processor 220b in the host bias mode may access the device memory 230b through the controller 211b, similar to accessing a host memory (e.g., 140 of FIG. 1).

To perform a task by the device 210b or an accelerator circuit included in the device 210b, an access of the device 210b to the device memory 230b may be required even in the host bias mode. When the device 210b accesses the device memory 230b in the host bias mode, for memory coherence, as marked with the dashed arrow in FIG. 2B, the controller 211b may request an approval for an access to the device memory 230b by performing communication C3 with the host processor 220b, receive an approval for the access to the device memory 230b from the host processor 220b by performing communication C4 with the host processor 220b, and then access the device memory 230b through communication C5. Accordingly, in the host bias mode, an access of the device 210b to the device memory 230b may be delayed.

Figure 3A:
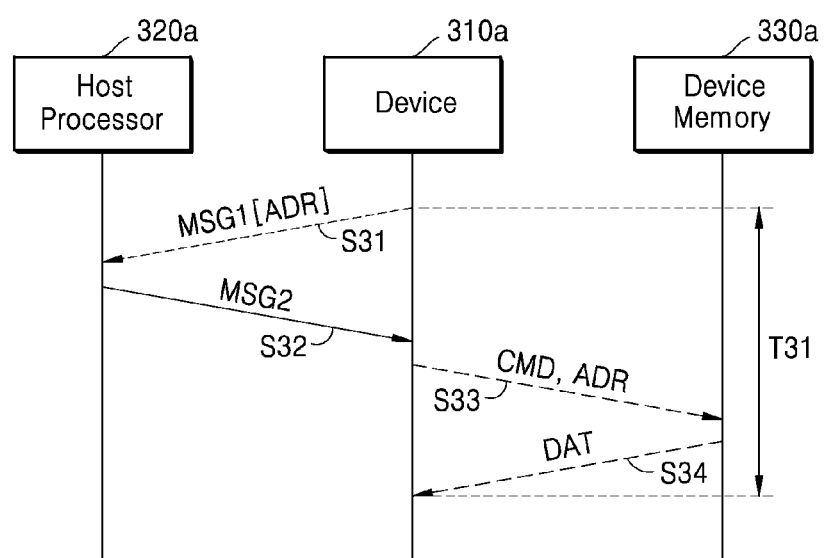
FIGS. 3A and 3B are message diagrams of examples of a method of accessing a device-attached memory.
Figure 3B:
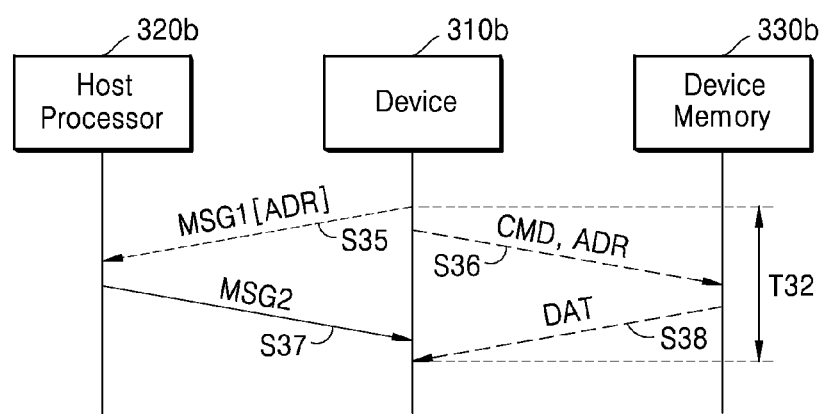

FIGS. 3A and 3B are message diagrams of examples of a method of accessing a device-attached memory. Particularly, the message diagram of FIG. 3A illustrates an access of a device 310a to a device memory 330a in the host bias mode according to a comparative example, and FIG. 3B illustrates an access of a device 310b to a device memory 330b in the host bias mode according to an example embodiment of the inventive concept. Hereinafter, descriptions previously given with respect to FIGS. 3A and 3B will be omitted.

Referring to FIG. 3A, in operation S31, the device 310a may provide a first message MSG1 including an address ADR to a host processor 320a. For example, the device 310a may provide the first message MSG1 including the address ADR to the host processor 320a in order to read data DAT stored in a region of the device memory 330a corresponding to the address ADR. In some embodiments, as described below with reference to FIG. 9, the first message MSG1 may be to request resolution of coherence on the region corresponding to the address ADR. In some embodiments, the first message MSG1 may be provided from the device 310a to the host processor 320a based on a coherent protocol (e.g., CXL.cache).

In operation S32, the host processor 320a may provide a second message MSG2 to the device 310a. For example, the host processor 320a may approve, through the second message MSG2, an access of the device 310a to the region of the device memory 330a corresponding to the address ADR included in the first message MSG1, in response to the first message MSG1 received in operation S31. In some embodiments, as described below with reference to FIG. 9, the second message MSG2 may indicate completion of the resolution of coherence on the region corresponding to the address ADR. In some embodiments, the second message MSG2 may be provided from the host processor 320a to the device 310a based on a memory protocol (e.g., CXL.mem).

In operation S33, the device 310a may provide a read command CMD and the address ADR to the device memory 330a, and in operation S34, the device memory 330a may provide the data DAT to the device 310a. For example, the device 310a may provide the read command CMD together with the address ADR to the device memory 330a to read the data DAT from the region of the device memory 330a corresponding to the address ADR, in response to the second message MSG2 received in operation S32. The device memory 330a may provide the data DAT stored in the region corresponding to the address ADR, to the device 310a in response to the read command CMD. As described above with reference to FIG. 1, the device 310a and the device memory 330a may communicate with each other based on a device-specific protocol.

Referring to FIG. 3B, in operation S35, the device 310b may provide the first message MSG1 including the address ADR to a host processor 320b. For example, the device 310b may provide the first message MSG1 including the address ADR to the host processor 320b in order to read the data DAT stored in a region of the device memory 330b corresponding to the address ADR.

In operation S36, the device 310b may provide the read command CMD and the address ADR to the device memory 330b. Compared to the example of FIG. 3A, the device 310b may provide the read command CMD and the address ADR to the device memory 330b before the second message MSG2 provided from the host processor 320b is received. That is, the device 310b may start an operation of reading the data DAT from the device memory 330b before the second message MSG2 provided from the host processor 320b is received. In some embodiments, unlike shown in FIG. 3B, operation S36 may be performed in parallel to operation S35, or operations S36 and S35 may be sequentially performed.

In operation S37, the host processor 320b may provide the second message MSG2 to the device 310b. For example, the host processor 320b may approve, through the second message MSG2, an access of the device 310b to the region of the device memory 330b corresponding to the address ADR included in the first message MSG1, in response to the first message MSG1 received in operation S35.

In operation S38, the device memory 330b may provide the data DAT to the device 310b. For example, the device memory 330b may provide the data DAT stored in the region corresponding to the address ADR, to the device 310b in response to the read command CMD received in operation S36. In some embodiments, unlike shown in FIG. 3B, the device 310b may simultaneously receive the second message MSG2 and the data DAT or receive the data DAT before receiving the second message MSG2.

The device 310b of FIG. 3B may use the data DAT earlier than the device 310a of FIG. 3A. For example, the device 310a of FIG. 3A may use the data DAT after receiving the data DAT from the device memory 330a in operation S34, and accordingly, the device 310a of FIG. 3A may use the data DAT at a time point when a time T31 elapses from a time point when the first message MSG1 is provided to the host processor 320a in operation S31. As another example, the device 310b of FIG. 3B may use the data DAT at a later time point among a time point when the data DAT is received in operation S38 and a time point when the second message MSG2 is received from the host processor 320b in operation S37. Accordingly, the device 310b of FIG. 3B may use the data DAT at a time point when a time T32 elapses from a time point when the first message MSG1 is provided to the host processor 320b in operation S35. Unlike the example of FIG. 3A, in the example of FIG. 3B, a period taken to read the data DAT from the device memory 330b may at least partially overlap a period of communicating with the host processor 320b, and accordingly, an access latency of the device 310b to the device memory 330b in FIG. 3B may be shorter than an access latency of the device 310a to the device memory 330a in FIG. 3A (T32<T31). Herein, like the example of FIG. 3B, starting or performing an operation of reading the data DAT from the device memory 330b before receiving the second message MSG2 from the host processor 320b may be referred to as prefetch of the data DAT. In some embodiments, the prefetch of the data DAT may include an operation, performed by the device 310b, of receiving the data DAT from the device memory 330b as shown in FIG. 3B or include an operation of copying the data DAT from a lower-level memory to a higher-level memory inside the device memory 330b as described below with reference to FIG. 8.

Figure 4:
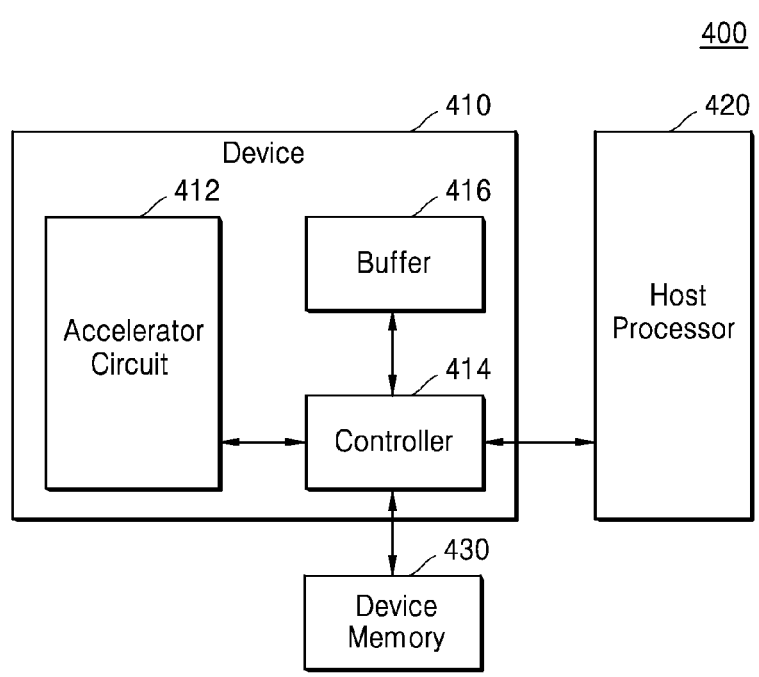
FIG. 4 is a block diagram of a system according to an example embodiment.

FIG. 4 is a block diagram of a system 400 according to an example embodiment. Particularly, the block diagram of FIG. 4 illustrates an example structure of a device 410 together with a host processor 420 and a device memory 430. Referring to FIG. 4, the device 410 may include an accelerator circuit 412, a controller 414, and a buffer 416.

The accelerator circuit 412 may perform a function provided by the device 410 to the host processor 420 as described above with reference to FIG. 1. To this end, the accelerator circuit 412 may communicate with the host processor 420 and access the device memory 430 through the controller 414. In some embodiments, the accelerator circuit 412 may communicate with the buffer 416, i.e., receive data from the buffer 416 or provide data to the buffer 416.

The controller 414 may control an access to the device memory 430 and may be referred to as a coherence engine. For example, the controller 414 may be set to the device bias mode or the host bias mode and control an access of the accelerator circuit 412 and/or the host processor 420 to the device memory 430 based on the set mode. In some embodiments, the controller 414 may provide the first message MSG1 to the host processor 420 and perform a read operation on the device memory 430, as described above with reference to FIG. 3B. Examples of an operation of the controller 414 will be described below with reference to FIG. 5 and the like.

The buffer 416 may communicate with the controller 414 and temporarily store data provided from the controller 414. For example, the controller 414 may temporarily store, in the buffer 416, data read from the device memory 430 and/or data to be written on the device memory 430. In some embodiments, as described below with reference to FIG. 6, the controller 414 may store, in the buffer 416, data prefetched from the device memory 430.

Figure 5:
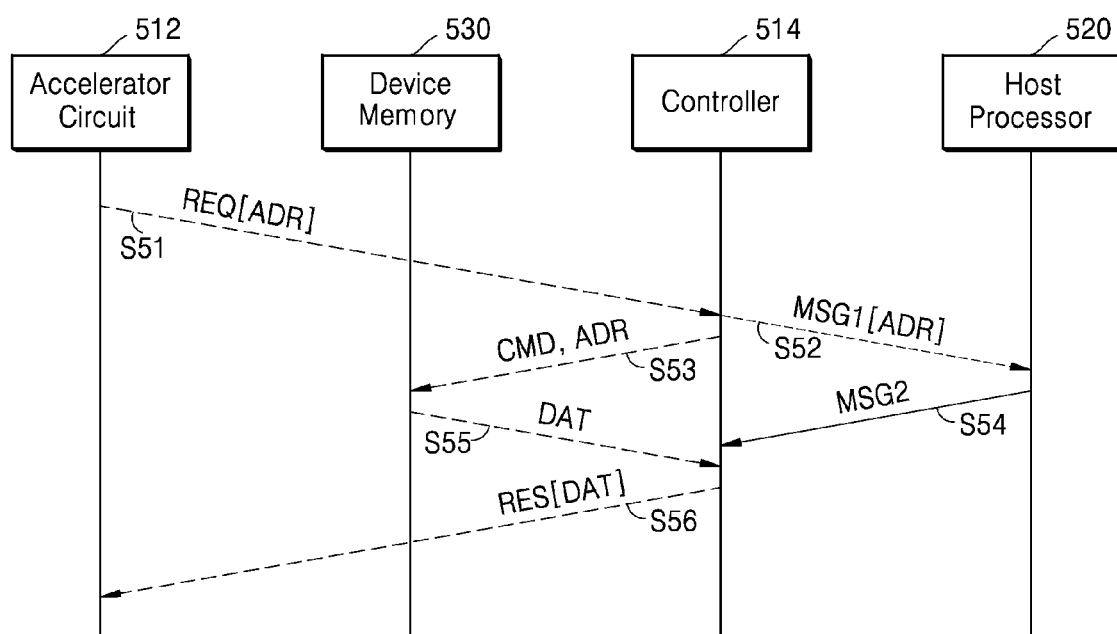
FIG. 5 is a message diagram of a method of accessing a device-attached memory, according to an example embodiment.

FIG. 5 is a message diagram of a method of accessing a device-attached memory, according to an example embodiment. Particularly, the message diagram of FIG. 5 illustrates, with respect to time, messages and/or data transmitted and received among a device memory 530, a host processor 520, and an accelerator circuit 512 and a controller 514 included in a device. In the example of FIG. 5, it is assumed that the controller 514 and the host processor 520 are set to the host bias mode.

Referring to FIG. 5, in operation S51, the accelerator circuit 512 may provide a read request REQ including the address ADR to the controller 514. For example, the accelerator circuit 512 may require the data DAT stored in a region of the device memory 530 corresponding to the address ADR to perform a given function, and accordingly, the accelerator circuit 512 may provide the read request REQ including the address ADR to the controller 514.

In operation S52, the controller 514 may provide the first message MSG1 including the address ADR to the host processor 520. In the host bias mode, the controller 514 may provide the first message MSG1 including the address ADR to the host processor 520 in order to process the read request REQ provided from the accelerator circuit 512.

In operation S53, the controller 514 may provide the read command CMD and the address ADR to the device memory 530. For example, to prefetch the data DAT, the controller 514 may provide the read command CMD and the address ADR to the device memory 530 before receiving the second message MSG2 from the host processor 520.

In operation S54, the host processor 520 may provide the second message MSG2 to the controller 514. For example, the first message MSG1 received from the controller 514 in operation S52 may request resolution of coherence on the region of the device memory 530 corresponding to the address ADR, and the host processor 520 may provide, to the controller 514, the second message MSG2 indicating completion of the resolution of coherence. In some embodiments, the second message MSG2 may correspond to MemRdFwd supported by the CXL.mem protocol of the CXL specification.

In operation S55, the device memory 530 may provide the data DAT to the controller 514. For example, the device memory 530 may provide the data DAT stored in the region corresponding to the address ADR, to the controller 514 in response to the read command CMD received in operation S53. As described above with reference to FIG. 3B, in some embodiments, the controller 514 may receive the data DAT before receiving the second message MSG2 or simultaneously receive the second message MSG2 and the data DAT.

In operation S56, the controller 514 may provide a response RES including the data DAT to the accelerator circuit 512. As described above, because of the prefetch of the data DAT by the controller 514, a period of providing the first message MSG1 to the host processor 520 and receiving the second message MSG2 from the host processor 520 may at least partially overlap a period of reading the data DAT from the device memory 530. Accordingly, a time taken from a time point when the accelerator circuit 512 issues the read request REQ including the address ADR to a time point when the accelerator circuit 512 receives the response RES including the data DAT may be reduced, and as a result, the accelerator circuit 512 may complete a task based on the data DAT at an early stage.

Figure 6:
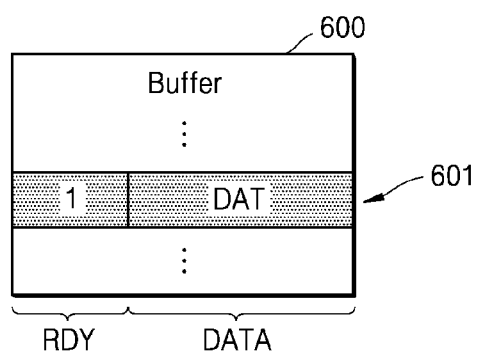
FIG. 6 is a block diagram of a buffer according to an example embodiment.

FIG. 6 is a block diagram of a buffer 600 according to an example embodiment. Particularly, the buffer 600 of FIG. 6 may be an example of the buffer 416 of FIG. 4 and correspond to a state after operation S55 of FIG. 5 ends. Hereinafter, FIG. 6 will be described with reference to FIG. 5, and it is assumed that the controller 514 of FIG. 5 accesses the buffer 600 of FIG. 6.

In some embodiments, the controller 514 may prefetch the data DAT by reading the data DAT from the device memory 530 and storing the read data DAT in the buffer 600. For example, as shown in FIG. 6, the controller 514 may store, in the buffer 600, a first entry 601 including the data DAT read from the device memory 530. When the data DAT is completely stored in the buffer 600, the controller 514 may provide the data DAT from the buffer 600 to the accelerator circuit 512.

The first entry 601 may include a ready field RDY and a data field DATA as shown in FIG. 6. The data field DATA may include the data read from the device memory 530, and the ready field RDY may indicate whether the data is completely stored in the data field DATA. For example, as shown in FIG. 6, the first entry 601 may fully include the data DAT in the data field DATA, and accordingly, the ready field RDY may have a value of "1."

The controller 514 may provide the data DAT to the accelerator circuit 512 based on the value included in the ready field RDY. For example, when receiving the read request REQ from the accelerator circuit 512, the controller 514 may generate, in the buffer 600, the first entry 601 including the ready field RDY having a value of "0". When receiving the second message MSG2 from the host processor 520, the controller 514 may provide the data DAT stored in the buffer 600 or wait until the data DAT is completely stored in the buffer 600, based on the value of the ready field RDY in the first entry 601.

Figure 7:
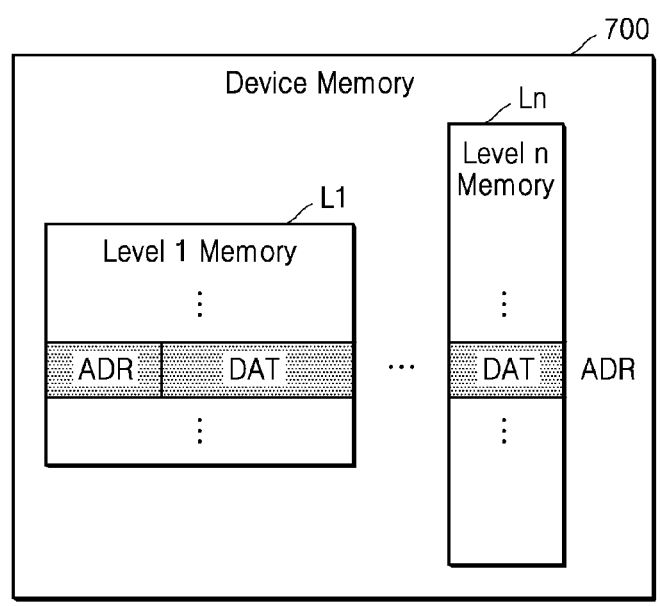
FIG. 7 is a block diagram of a device memory according to an example embodiment.

FIG. 7 is a block diagram of a device memory 700 according to an example embodiment. Particularly, the device memory 700 of FIG. 7 may be an example of the device memory 430 of FIG. 4, and hereinafter, FIG. 7 will be described with reference to FIG. 4, and it is assumed that the device memory 430 of FIG. 4 is the device memory 700 of FIG. 7.

In some embodiments, the device memory 700 may have a hierarchical structure. For example, as shown in FIG. 7, the device memory 700 may include first- to nth-level memories L1 to Ln (n is an integer greater than 1). A higher-level memory (e.g., a memory close to the first-level memory L1) may have a relatively small capacity and a relatively quick response speed, and a lower-level memory (e.g., a memory close to the nth-level memory Ln) may have a relatively large capacity and a relatively slow response speed.

The controller 414 may perform data prefetch by copying data stored in a lower-level memory to a higher-level memory. For example, as shown in FIG. 7, the controller 414 may copy the data DAT stored in a region of the nth-level memory Ln corresponding to the address ADR to the first-level memory L1 and also store the address ADR in the first-level memory L1, in order to prefetch the data DAT in response to the read request REQ including the address ADR, which is received from the accelerator circuit 412. Compared to a case in which the data DAT is stored only in the nth-level memory Ln, when the data DAT is stored in the first-level memory L1 as shown in FIG. 7, the data DAT may be read from the device memory 700 earlier. An example of a method of accessing a device memory of a hierarchical structure like the device memory 700 of FIG. 7 will be described below with reference to FIG. 8.

Figure 8:
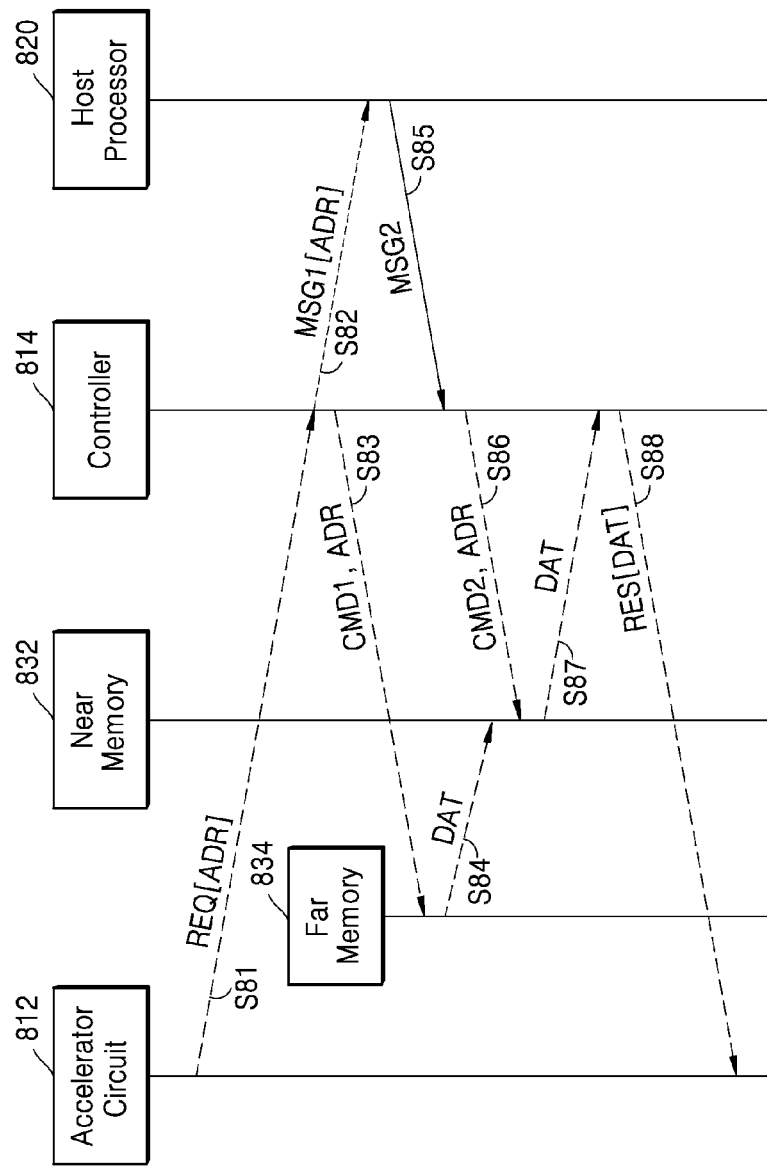
FIG. 8 is a message diagram of a method of accessing a device-attached memory, according to an example embodiment.

FIG. 8 is a message diagram of a method of accessing a device-attached memory, according to an example embodiment. Particularly, the message diagram of FIG. 8 illustrates, with respect to time, messages and/or data transmitted and received among a host processor 820, a near memory 832 and a far memory 834 included in a device memory, and an accelerator circuit 812 and a controller 814 included in a device. In some embodiments, the near memory 832 of FIG. 8 may correspond to the first-level memory L1 of FIG. 7, and the far memory 834 of FIG. 8 may correspond to the nth-level memory Ln of FIG. 7. In the example of FIG. 8, it is assumed that the controller 814 and the host processor 820 are set to the host bias mode.

Referring to FIG. 8, in operation S81, the accelerator circuit 812 may provide the read request REQ including the address ADR to the controller 814. For example, the accelerator circuit 812 may require the data DAT stored in a region of the far memory 834 corresponding to the address ADR to perform a given function, and accordingly, the accelerator circuit 812 may provide the read request REQ including the address ADR to the controller 814.

In operation S82, the controller 814 may provide the first message MSG1 including the address ADR to the host processor 820. In the host bias mode, the controller 814 may provide the first message MSG1 including the address ADR to the host processor 820 in order to process the read request REQ provided from the accelerator circuit 812. In operation S83, the controller 814 may provide a first read command CMD1 and the address ADR to the far memory 834. Although FIG. 8 shows for convenience of understanding that the first read command CMD1 and the address ADR are provided to the far memory 834, in some embodiments, the first read command CMD1 and the address ADR may be provided to a memory controller included in the device memory, which controls an access to the near memory 832 and the far memory 834.

In operation S84, the far memory 834 may provide data DAT to the near memory 832 in response to the first read command CMD1 and the first address ADR. In operation S85, the host processor 820 may provide a second message MSG2 to the controller 814 in response to the first message MSG1. In operation S86, the controller 814 may provide a second read command CMD2 and an address ADR to the near memory 832 in response to the second message MSG2.

In operation S87, the near memory 832 may provide the data DAT to the controller 814. For example, in response to a second read command CMD2 received in operation S86, a controller included in the device memory may identify an entry including the address ADR in the near memory 832, read the data DAT included in the identified entry from the near memory 832, and provide the read data DAT to the controller 814. A time taken from when the controller 814 receives the second message MSG2 from the host processor 820 to when the controller 814 receives the data DAT from the device memory may be reduced by providing the data DAT from the near memory 832.

In operation S88, the controller 814 may provide the response RES including the data DAT to the accelerator circuit 812. As described above, because of the prefetch by the controller 814, a period of providing the first message MSG1 to the host processor 820 and receiving the second message MSG2 from the host processor 820 may at least partially overlap a period of reading the data DAT from the far memory 834 in the device memory. Accordingly, a time taken from a time point when the accelerator circuit 812 issues the read request REQ including the address ADR to a time point when the accelerator circuit 812 receives the response RES including the data DAT may be reduced, and as a result, the accelerator circuit 812 may complete a task based on the data DAT at an early stage.

Figure 9:
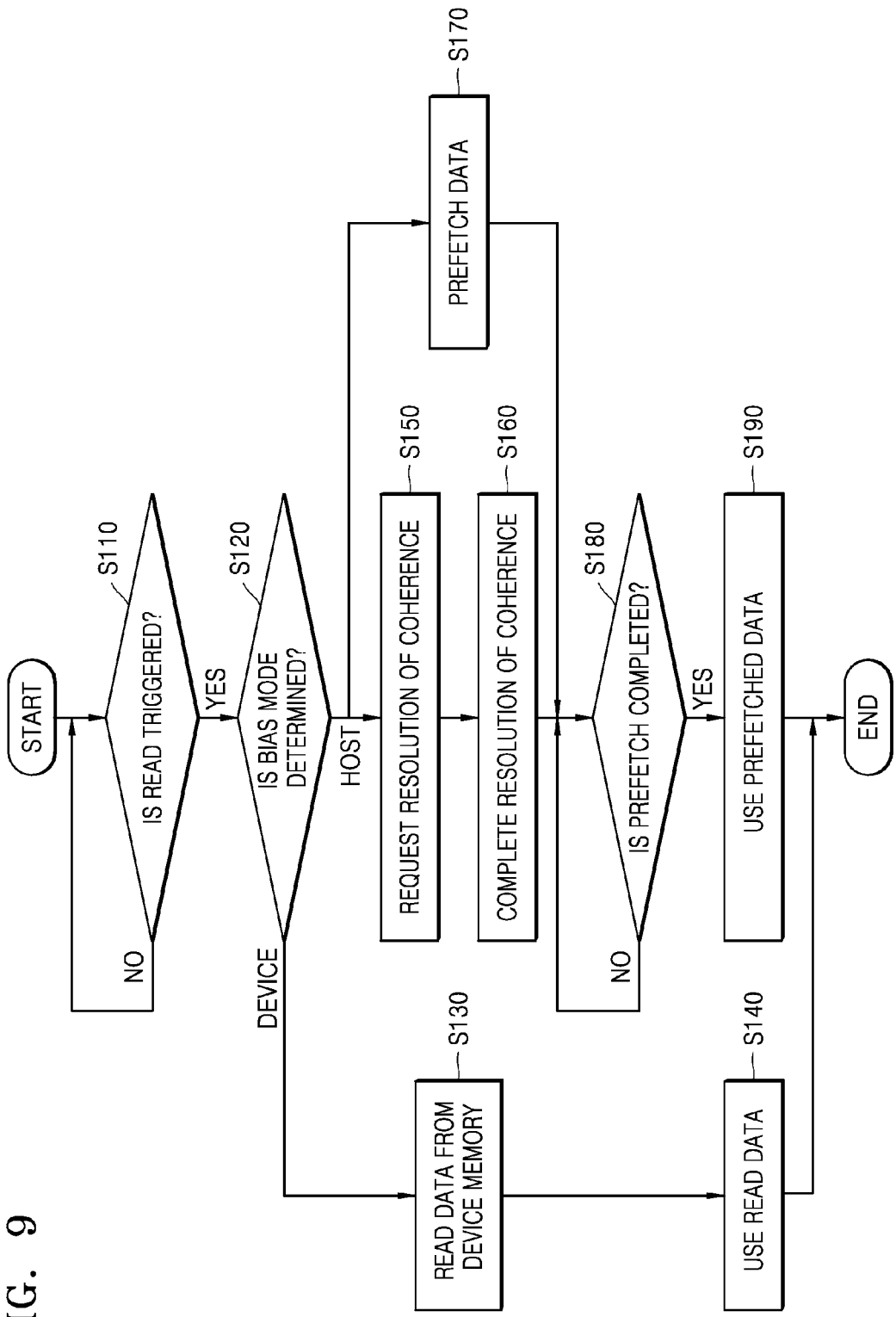
FIG. 9 is a flowchart of a method of accessing a device-attached memory, according to an example embodiment.

FIG. 9 is a flowchart of a method of accessing a device-attached memory, according to an example embodiment. Particularly, the flowchart of FIG. 9 illustrates an example of an operating method for a device to read data stored in the device-attached memory. As shown in FIG. 9, the method of accessing the device-attached memory may include a plurality of operations S110 to S190. In some embodiments, the method of FIG. 9 may be performed by the device 410 of FIG. 4, and hereinafter, FIG. 9 will be described with reference to FIG. 4.

Referring to FIG. 9, in operation S110, it may be determined whether to trigger a read. For example, the accelerator circuit 412 may trigger a data read (or a read operation) by issuing a read request for data stored in the device memory 430, in order to perform a task. The controller 414 may receive a read request including an address from the accelerator circuit 412. As shown in FIG. 9, when a read operation of the device 410 on the device memory 430 is triggered, operation S120 may be subsequently performed.

In operation S120, a bias mode for accessing the device memory 430 may be determined. For example, when the controller 414 receives the read request from the accelerator circuit 412, the controller 414 may identify whether a currently set mode is the device bias mode or the host bias mode. As described above with reference to FIGS. 2A and 2B, the bias mode for accessing the device memory 430 may be set in various manners, and the controller 414 may identify the set bias mode. As shown in FIG. 9, when the device bias mode is identified, operation S130 may be subsequently performed. Otherwise, when the host bias mode is identified, operations S150 and S170 may be subsequently performed in parallel.

When the device bias mode is identified in operation S120, data may be read from the device memory 430 in operation S130. For example, as described above with reference to FIG. 2A, the device 410 in the device bias mode may access, independently to the host processor 420, to the device memory 430 based on a high bandwidth and a low latency. Accordingly, when receiving a read request of the accelerator circuit 412 in the device bias mode, the controller 414 may read data from the device memory 430 based on an address included in the read request. In some embodiments, the controller 414 may store, in the buffer 416, the data read from the device memory 430.

In operation S140, the read data may be used. For example, the accelerator circuit 412 may receive a response including data from the controller 414 and perform a task based on the received data. In some embodiments, the accelerator circuit 412 may receive data from the buffer 416 (e.g., through the controller 414).

When the host bias mode is identified in operation S120, resolution of coherence may be requested in operation S150. For example, the controller 414 may provide the address included in the read request received in operation S110 to the host processor 420 and request resolution of coherence on a region of the device memory 430 corresponding to the address. In the host bias mode, because the memory coherence of the device memory 430 is managed by the host processor 420, the controller 414 may provide, to the host processor 420, a message (e.g., MSG1 of FIG. 5) for requesting resolution of coherence. An example of operation S150 will be described below with reference to FIG. 10.

In operation S160, the resolution of coherence may be completed. For example, the host processor 420 may complete the resolution of coherence, which has been requested from the controller 414 in the device 410, and provide a message (e.g., MSG2 of FIG. 5) indicating completion of the resolution of coherence to the controller 414 in the device 410. In some embodiments, the host processor 420 may provide MemRdFwd supported by the CXL.mem protocol of the CXL specification to the controller 414, and MemRdFwd may indicate that data is forwarded from the device memory 430 to the device 410 without any completion by the host processor 420. An example of operation S160 will be described below with reference to FIG. 10.

When the host bias mode is identified in operation S120, data may be prefetched in operation S170 in parallel to operations S150 and S160. For example, the controller 414 may prefetch data from the device memory 430 in parallel to communication with the host processor 420 for resolution of coherence. Accordingly, as described below with reference to the drawings, a time taken for the accelerator circuit 412 to acquire data in the host bias mode may be reduced. Examples of operation S170 will be described below with reference to FIGS. 11A and 11B.

Next to operations S160 and S170, it may be determined in operation S180 whether the prefetch is completed. For example, according to performing operation S170 in parallel to operations S150 and S160, data may not be completely prefetched at a time point when the resolution of coherence is completed in operation S160, i.e., a time point when the controller 414 receives a message (e.g., MSG2 of FIG. 5) indicating the resolution of coherence from the host processor 420. In some embodiments, the controller 414 may determine whether to complete the prefetch, based on a value of the ready field RDY in the buffer 600 as described above with reference to FIG. 6. In addition, in some embodiments, when a data prefetch includes a data copy from a lower-level memory in the device memory 430 to a higher-level memory, the controller 414 may determine completion of the prefetch by reading data stored in the higher-level memory from the device memory 430. As shown in FIG. 9, when the prefetch is completed, operation S190 may be subsequently performed.

In operation S190, the prefetched data may be used. For example, the accelerator circuit 412 may receive the data prefetched by the controller 414 and perform a task based on the received data. In some embodiments, when the data prefetched by the controller 414 is stored in the buffer 416, the accelerator circuit 412 may receive the data stored in the buffer 416.

Figure 10:
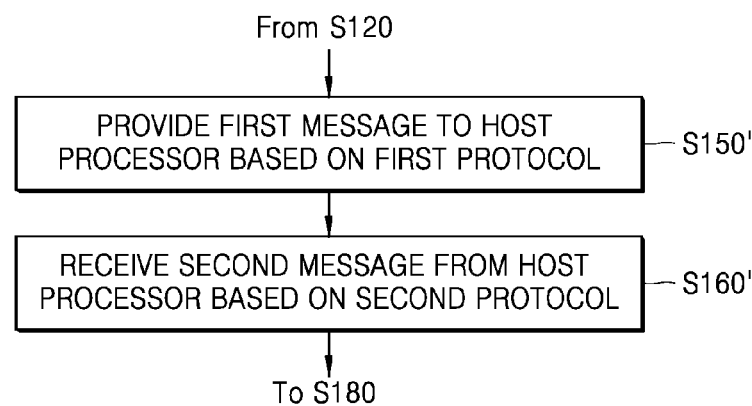
FIG. 10 is a flowchart of a method of accessing a device-attached memory, according to an example embodiment.

FIG. 10 is a flowchart of a method of accessing a device-attached memory, according to an example embodiment. Particularly, the flowchart of FIG. 10 illustrates an example of operations S150 and S160 of FIG. 9. As described above with reference to FIG. 9, resolution of coherence may be requested in operation S150' of FIG. 10, and the resolution of coherence may be completed in operation S160'. In some embodiments, operations S150' and S160' of FIG. 10 may be performed by the controller 414 of FIG. 4, and hereinafter, FIG. 10 will be described with reference to FIGS. 4 and 9.

Next to operation S120 of FIG. 9, the first message MSGT may be provided to the host processor 420 based on a first protocol in operation S150'. As described above with reference to FIG. 1, the device 410 and the host processor 420 may communicate with each other based on the multiple protocols, and the controller 414 may provide the first message MSG1 for requesting resolution of coherence to the host processor 420 based on the first protocol among the multiple protocols. In some embodiments, the first protocol is a coherent protocol and may correspond to CXL.cache of the CXL specification, and the first message MSG1 may correspond to Rd* of the CXL specification.

In operation S160', the second message MSG2 may be received from the host processor 420 based on a second protocol. That is, the second message MSG2 may be received based on the second protocol that is different from the first protocol used to provide the first message MSG1 in operation S150'. In some embodiments, the second protocol is a memory protocol and may correspond to CXL.mem of the CXL specification, and the second message MSG2 may correspond to MemRdFwd of the CXL specification. As shown in FIG. 10, operation S180 of FIG. 9 may be performed next to operation S160'.

Figure 11A:
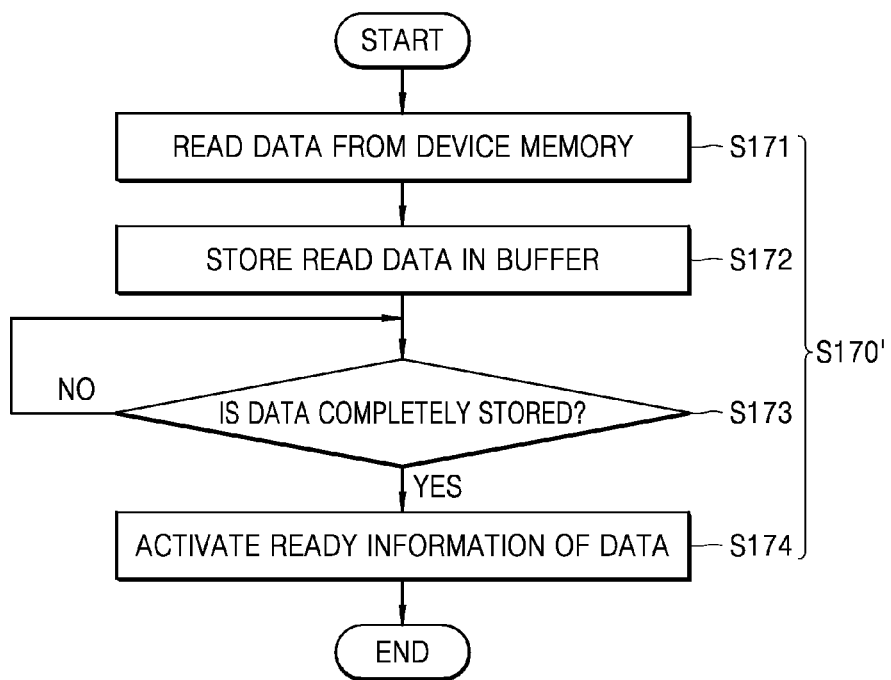
FIGS. 11A and 11B are flowcharts of examples of a method of accessing a device-attached memory, according to example embodiments.
Figure 11B:
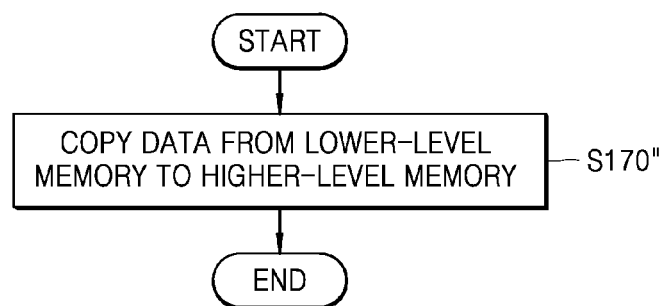

FIGS. 11A and 11B are flowcharts of examples of a method of accessing a device-attached memory, according to example embodiments. Particularly, the flowcharts of FIGS. 11A and 11B illustrate examples of operation S170 of FIG. 9, respectively. As described above with reference to FIG. 9, data may be prefetched in operation S170. In some embodiments, operation S170' of FIG. 11A and operation S170" of FIG. 11B may be performed by the controller 414 and/or the device memory 430 of FIG. 4, and hereinafter, FIGS. 11A and 11B will be described with reference to FIGS. 4 and 9.

Referring to FIG. 11A, operation S170' may include a plurality of operations S171 to S174. In operation S171, data may be read from the device memory 430. For example, the controller 414 may read data from the device memory 430 based on an address included in a read request received from the accelerator circuit 412. Next, in operation S172, the read data may be stored in the buffer 416. For example, the controller 414 may sequentially store, in the buffer 416, data received from the device memory 430. In some embodiments, the controller 414 may inactivate ready information of data being stored in the buffer 416. For example, as described above with reference to FIG. 6, the controller 414 may generate an entry in the buffer 416 and store the value of "0" in the ready field RDY of the entry.

In operation S173, it may be determined whether the data is completely stored in the buffer 416. For example, the controller 414 may determine whether all data is received from a region of the device memory 430 corresponding to an address provided from the accelerator circuit 412 and stored in the buffer 416. As shown in FIG. 11A, when the data is completely stored, the ready information of the data may be activated in operation S174. For example, as described above with reference to FIG. 6, the controller 414 may store the value of "1" in the ready field RDY of the entry.

Referring to FIG. 11B, in operation S170", data may be copied from a lower-level memory to a higher-level memory. For example, the device memory 430 of FIG. 4 may have a hierarchical structure like the device memory 700 of FIG. 7 and include two or more memories respectively corresponding to different levels. The controller 414 may provide, to the device memory 430, a command indicating copy of data stored in a lower-level memory to a higher-level memory in order to prefetch the data, and the device memory 430 or a memory controller included in the device memory 430 may read the data stored in the lower-level memory and store the read data in the higher-level memory. Accordingly, by copying the data to the higher-level memory which provides a relatively fast response speed, a time to be taken to read the data from the device memory 430 thereafter may be reduced.

Figure 12:
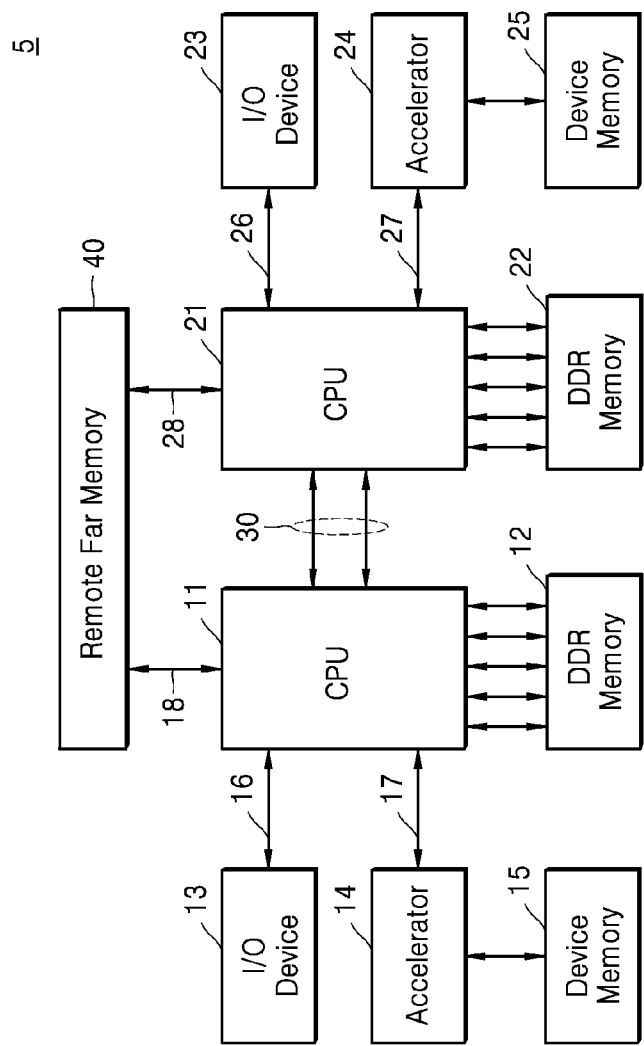
FIG. 12 is a block diagram of a system according to an example embodiment.

FIG. 12 is a block diagram of a system according to an example embodiment. Particularly, the block diagram of FIG. 12 illustrates a system 5 including multiple CPUs.

Referring to FIG. 12, the system 5 may include a first CPU 11 and a second CPU 21 and include a first double data rate (DDR) memory 12 and a second DDR memory 22 respectively connected to the first CPU 11 and the second CPU 21. The first CPU 11 and the second CPU 21 may be connected through an interconnect system 30 based on a processor interconnect technique. As shown in FIG. 12, the interconnect system 30 may provide at least one CPU-to-CPU coherent link.

The system 5 may include a first I/O device 13 and a first accelerator 14, which communicate with the first CPU 11, and include a first device memory 15 connected to the first accelerator 14. The first CPU 11 and the first I/O device 13 may communicate with each other via a bus 16, and the first CPU 11 and the first accelerator 14 may communicate with each other via a bus 17. In addition, the system 5 may include a second I/O device 23 and a second accelerator 24, which communicate with the second CPU 21, and include a second device memory 25 connected to the second accelerator 24. The second CPU 21 and the second I/O device 23 may communicate with each other via a bus 26, and the second CPU 21 and the second accelerator 24 may communicate with each other via a bus 27. In some embodiments, at least one of the first device memory 15 and the second device memory 25 may be omitted from the system 5.

In addition, the system 5 may include a remote far memory 40. The first CPU 11 and the second CPU 21 may be connected to the remote far memory 40 via buses 18 and 28, respectively. The remote far memory 40 may be used for memory expansion in the system 5, and the buses 18 and 28 may be used as memory expansion ports. In some embodiments, the remote far memory 40 may be omitted from the system 5.

Communication based on at least some of the multiple protocols may be performed via the buses 16, 17, 18, 26, 27, and 28. For example, information about an initial configuration and the like may be provided via each of the buses 16, 17, 18, 26, 27, and 28 based on a non-coherent protocol. In addition, a message and/or data may be provided via the buses 17 and 27 based on a coherent protocol and/or a memory protocol. In addition, a message and/or data may be provided via the buses 18 and 28 based on a memory protocol.

To access the first device memory 15, the first accelerator 14 may be set to the device bias mode or the host bias mode. As described above with reference to the drawings, the first accelerator 14 in the host bias mode may prefetch data stored in the first device memory 15 in parallel to notifying, via the bus 17, the first CPU 11 of an access to the first device memory 15 when triggering a read operation on the first device memory 15. Accordingly, when an approval for the access to the first device memory 15 is received from the first CPU 11 via the bus 17, the first accelerator 14 may use the prefetched data, and as a result, a task based on the data may be quickly completed.

Similar to the first accelerator 14, to access the second device memory 25, the second accelerator 24 may be set to the device bias mode or the host bias mode. As described above with reference to the drawings, the second accelerator 24 in the host bias mode may prefetch data stored in the second device memory 25 in parallel to notifying, via the bus 27, the second CPU 21 of an access to the second device memory 25 when triggering a read operation on the second device memory 25. Accordingly, when an approval for the access to the second device memory 25 is received from the second CPU 21 via the bus 27, the second accelerator 24 may use the prefetched data, and as a result, a task based on the data may be quickly completed.

Figure 13:
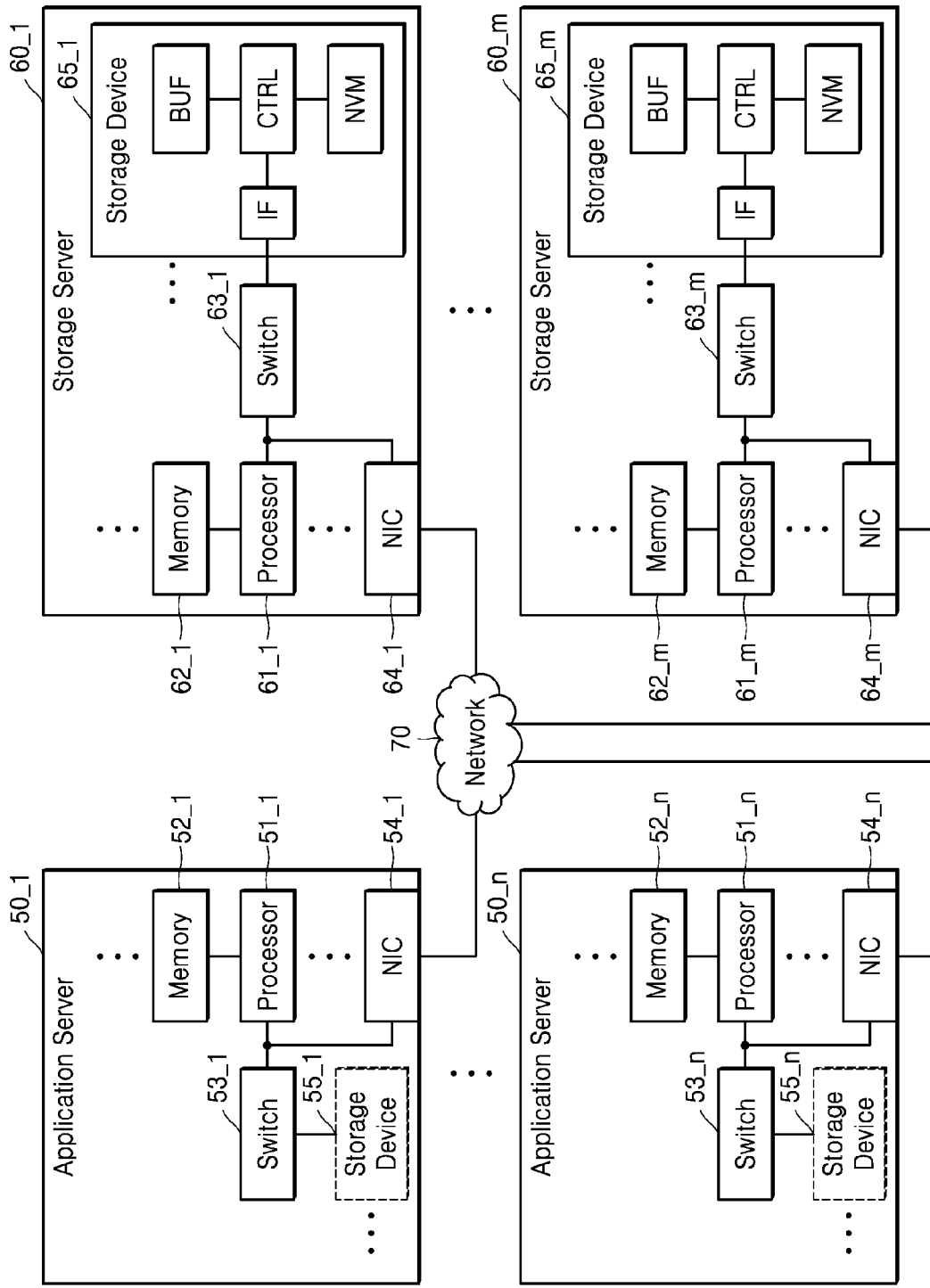
FIG. 13 is a block diagram of a data center including a system, according to an example embodiment.

FIG. 13 is a block diagram of a data center 7 including a system, according to an example embodiment. In some embodiments, a system described above with reference to the drawings may be included as an application server and/or a storage server in the data center 7.

Referring to FIG. 13, the data center 7 may collect various pieces of data, provide a service, and be referred to as a data storage center. For example, the data center 7 may be a system for operating a search engine and a database or a computing system used in a company such as a bank or a government organization. As shown in FIG. 13, the data center 7 may include application servers 50_1 to 50_$n$ and storage servers 60_1 to 60_$m$ (m and n are integers greater than 1). The number n of application servers 50_1 to 50_$n$ and the number m of storage servers 60_1 to 60_$m$ may be variously selected according to embodiments, and the number n of application servers 50_1 to 50_$n$ may differ from the number m of storage servers 60_1 to 60_$m$ (m≠n).

The application server 50_1 or 50_$n$ may include at least one of a processor 51_1 or 51_$n$, a memory 52_1 or 52_$n$, a switch 53_1 or 53_$n$, a network interface controller (NIC) 541 or 54_$n$, and a storage device 55_1 or 55_$n$. The processor 51_1 or 51_$n$ may control a general operation of the application server 50_1 or 50_$n$ and access the memory 52_1 or 52_$n$ to execute instructions and/or data loaded on the memory 521 or 52_$n$. The memory 52_1 or 52_$n$ may include, as a non-limited example, double data rate synchronous dynamic random access memory (DDR SDRAM), a high bandwidth memory (HBM), a hybrid memory cube (HMC), a dual in-line memory module (DIMM), an Optane DIMM, or a nonvolatile DIMM (NVMDIMM). According to embodiments, the numbers of processors and memories included in the application server 50_1 or 50_$n$ may be variously selected. In some embodiments, the processor 51_1 or 51_$n$ and the memory 52_1 or 52_$n$ may provide a processor-memory pair. In some embodiments, the number of processors 51_1 to 51_$n$ may differ from the number of memories 52_1 to 52_$n$. The processor 51_1 or 51_$n$ may include a single-core processor or a multi-core processor. In some embodiments, as shown as a dashed line in FIG. 13, the storage device 55_1 or 55_$n$ may be omitted from the application server 50_1 or 50_$n$. The number of storage devices 55_1 or 55_$n$ included in the application server 50_1 or 50_$n$ may be variously selected according to embodiments. The processor 51_1 or 51_$n$, the memory 52_1 or 52_$n$, the switch 53_1 or 53_$n$, the NIC 54_1 or 54_$n$, and/or the storage device 55_1 or 55_$n$ may communicate with each other through a link described above with reference to the drawings.

The storage server 60_1 or 60_$m$ may include at least one of a processor 61_1 or 61_$m$, a memory 62_1 or 62_$m$, a switch 63_1 or 63_$m$, an NIC 64_1 or 64_$m$, and a storage device 65_1 or 65_$m$. The processor 61_1 or 61_$m$ and the memory 62_1 or 62_$m$ may operate similarly to the processor 51_1 or 51_$n$ and the memory 521 or 52_$n$ in the application server 50_1 or 50_$n$ described above.

The application servers 50_1 to 50_$n$ and the storage servers 60_1 to 60_$m$ may communicate with each other over a network 70. In some embodiments, the network 70 may be implemented by using Fibre Channel (FC), Ethernet, or the like. FC may be a medium used to transmit data at a relatively high speed, and an optical switch configured to provide high performance/high usability may be used for FC. According to an access mode of the network 70, the storage servers 60_1 to 60_m may be provided as a file storage, a block storage, or an object storage.

In some embodiments, the network 70 may be a storage exclusive network such as a storage area network (SAN). For example, the SAN may be an FC-SAN capable of using an FC network and implemented according to an FC protocol (FCP). As another example, the SAN may be an IP-SAN using a transmission control protocol/Internet protocol (TCP/IP) network and implemented according to a small computer system interface (SCSI) over TCP/IP or Internet SCSI (iSCSI) protocol. In some embodiments, the network 70 may be a general network such as a TCP/IP network. For example, the network 70 may be implemented according to an FC over Ethernet (FCoE) protocol, a network attached storage (NAS) protocol, a nonvolatile memory express (NVMe) over fabrics (NVMe-oF) protocol, or the like.

Hereinafter, the application server 50_1 and the storage server 60_1 will be mainly described, but the description about the application server 50_1 may also be applied to another application server (e.g., 50_n), and the description about the storage server 60_1 may also be applied to another storage server (e.g., 60_m).

The application server 50_1 may store data which a user or a client requests to store, in one of the storage servers 60_1 to 60_m over the network 70. In addition, the application server 50_1 may acquire data which a user or a client requests to read, from one of the storage servers 60_1 to 60_m over the network 70. For example, the application server 501 may be implemented by a web server, a database management system (DBMS), or the like.

The application server 50_1 may access the memory 52_n and/or the storage device 55_n included in the application server 50_n over the network 70 and/or access the memories 62_1 to 62_m and/or the storage devices 65_1 to 65_m included in the storage servers 60_1 to 60_m over the network 70. Accordingly, the application server 501 may perform various operations on data stored in the application servers 50_1 to 50_n and/or the storage servers 60_1 to 60_m. For example, the application server 50_1 may execute an instruction for moving or copying data between the application servers 50_1 to 50_n and/or the storage servers 60_1 to 60_m. In this case, the data may be moved from the storage devices 65_1 to 65_m in the storage servers 60_1 to 60_m to the memories 52_1 to 52_n in the application servers 50_1 to 50_n through the memories 62_1 to 62_m in the storage servers 60_1 to 60_m or directly. In some embodiments, data moved over the network 70 may be encrypted data for security or privacy.

In the storage server 60_1, an interface IF may provide a physical connection between the processor 61_1 and a controller CTRL and a physical connection between the NIC 64_1 and the controller CTRL. For example, the interface IF may be implemented by a direct attached storage (DAS) mode of directly accessing the storage device 65_1 through an exclusive cable. In addition, for example, the interface IF may be implemented by various interface schemes such as advanced technology attachment (ATA), serial ATA (SATA), external SATA (e-SATA), SCSI, serial attached SCSI (SAS), PCI, PCIe, NVMe, Institute of Electrical and Electronics Engineers (IEEE) 1394, universal serial bus (USB), secure digital (SD) card, multimedia card (MMC), embedded multimedia card (eMMC), universal flash storage (UFS), embedded UFS (eUFS), and compact flash (CF) interfaces.

In the storage server 60_1, the switch 63_1 may selectively connect the processor 61_1 to the storage device 65_1 or selectively connect the NIC 64_1 to the storage device 65_1, under control of the processor 61_1.

In some embodiments, the NIC 64_1 may include a network interface card, a network adaptor, and the like. The NIC 64_1 may be connected to the network 70 by a wired interface, a wireless interface, a Bluetooth interface, an optical interface, or the like. The NIC 641 may include an internal memory, a digital signal processor (DSP), a host bus interface, and the like and may be connected to the processor 611, the switch 631, and/or the like through the host bus interface. In some embodiments, the NIC 64_1 may be integrated with at least one of the processor 61_1, the switch 63_1, and the storage device 65_1.

In the application servers 50_1 to 50_n or the storage servers 60_1 to 60_m, the processors 51_1 to 51_n or 61_1 to 61_m may program or read data by transmitting a command to the storage devices 55_1 to 55_n or 65_1 to 65_m or the memories 521 to 52_n or 62_1 to 62_m. Herein, the data may be error-corrected by an error correction code (ECC) engine. The data may include cyclic redundancy code (CRC) information as data bus inversion (DBI)- or data masking (DM)-processed data. The data may be encrypted data for security or privacy.

The storage devices 55_1 to 55_n or 65_1 to 65_m may transmit a control signal and a command/address signal to a nonvolatile memory device NVM (e.g., a NAND flash memory device) in response to a read command received from the processors 51_1 to 51_n or 61_1 to 61_m. Accordingly, when data is read from the nonvolatile memory device NVM, a read enable signal may be input as an output control signal and act to output the data to a DQ bus. A data strobe signal may be generated using the read enable signal. The command and address signals may be latched according to a leading edge or a trailing edge of a write enable signal.

The controller CTRL may generally control an operation of the storage device 65_1. In an embodiment, the controller CTRL may include static random access memory (SRAM). The controller CTRL may write data in the nonvolatile memory device NVM in response to a write command or read data from the nonvolatile memory device NVM in response to a read command. For example, the write command and/or the read command may be generated based on a request provided from a host, e.g., the processor 61_1 in the storage server 60_1, the processor 61_m in the storage server 60_m, or the processor 51_1 or 51_n in the application server 50_1 or 50_n. A buffer BUF may temporarily store (buffer) data to be written in the nonvolatile memory device NVM or data read from the nonvolatile memory device NVM. In some embodiments, the buffer BUF may include DRAM. In addition, the buffer BUF may store metadata, and the metadata may indicate user data, or data generated by the controller CTRL to manage the nonvolatile memory device NVM. The storage device 65_1 may include a secure element (SE) for security or privacy.

While the inventive concept has been particularly shown and described with reference to embodiments thereof, it will be understood that various changes in form and details may be made therein without departing from the spirit and scope of the following claims.

What is claimed is:

1. A device connected to a host processor via a bus, the device comprising:
   an accelerator circuit configured to operate based on a message received from the host processor; and
   a controller configured to control access to a memory connected to the device, wherein the device is configured to be set to a host bias mode or a device bias mode, and wherein the controller is further configured to, in the host bias mode and in response to a read request received from the accelerator circuit, provide a first message requesting resolution of coherence to the host processor and prefetch first data from the memory, and wherein the prefetch comprises sending a command to the memory before receiving a second message from the host processor in response to the first message.

2. The device of claim 1, wherein the controller, in response to the read request in the device bias mode, is further configured to:

read the first data from the memory, and
provide the first data to the accelerator circuit.

3. The device of claim 1, wherein the controller is further configured to receive the second message from the host processor, wherein the second message indicates completion of the resolution of coherence, and provide the first data to the accelerator circuit in response to the second message.

4. The device of claim 3, wherein the controller is further configured to provide the first message to the host processor via the bus based on a first protocol and receive the second message from the host processor via the bus based on a second protocol, and wherein the host processor is configured to access the memory through the bus and the controller based on the second protocol.

5. The device of claim 1, further comprising a buffer configured to store a copy of the first data that is prefetched, wherein the controller is further configured to provide the copy of the first data stored in the buffer to the accelerator circuit.

6. The device of claim 5, wherein the buffer is further configured to store ready information indicating whether the copy of the first data stored in the buffer is valid, and wherein the controller is further configured to, based on the ready information when the second message indicating completion of the resolution of coherence is received from the host processor, provide the copy of the first data stored in the buffer to the accelerator circuit or wait for reception of the first data from the memory.

7. The device of claim 1, wherein the memory comprises a higher-level memory and a lower-level memory, and wherein the controller is further configured to prefetch the first data by copying data from the lower-level memory to the higher-level memory as a copy of the first data.

8. The device of claim 7, wherein the controller is further configured to provide the copy of the first data to the accelerator circuit in response to the second message indicating completion of the resolution of coherence, the second message being received from the host processor.

9. A system comprising:

a host processor comprising at least one core configured to execute instructions;

a device connected to the host processor via a bus and configured to be set to a host bias mode or a device bias mode; and a memory connected to the device and configured to be accessed by the host processor through the device, wherein the device is further configured to, in the host bias mode, provide a first message requesting resolution of coherence to the host processor and prefetch first data from the memory before receiving, from the host processor, a second message indicating completion of the resolution of coherence, and wherein the prefetch comprises sending a command to the memory before receiving the second message from the host processor.

10. The system of claim 9, wherein the device is further configured to provide the first message to the host processor via the bus based on a first protocol and receive the second message from the host processor via the bus based on a second protocol, and wherein the host processor is configured to access the memory through the bus and through the device based on the second protocol.

11. The system of claim 9, wherein the device is further configured to, in the device bias mode, omit to provide the first message to the host processor and read the first data from the memory.

12. The system of claim 9, wherein the memory comprises:

a higher-level memory; and
a lower-level memory, and
wherein the device is further configured to prefetch the first data by copying data from the lower-level memory to the higher-level memory.

13. The system of claim 9, wherein the device comprises a buffer configured to store a copy of the first data that is prefetched, and wherein the device is further configured to use the copy of the first data stored in the buffer when the second message is received from the host processor.

14. The system of claim 13, wherein the buffer is further configured to store ready information indicating whether the copy of the first data stored in the buffer is valid, and wherein the device is further configured to, based on the ready information when the second message is received from the host processor, use the copy of the first data stored in the buffer or wait for reception of the first data from the memory.

15. A method of operating a device connected to a host processor via a bus, the method comprising:

setting a host bias mode as a mode for accessing a memory connected to the device;

providing, to the host processor via the bus, a first message requesting resolution of coherence on a region in the memory corresponding to an address;

prefetching first data from the region in the memory based on the address, wherein the prefetching comprises sending a command to the memory before receiving a second message from the host processor in response to the first message; and receiving, from the host processor via the bus, the second message indicating completion of the resolution of coherence on the region in the memory.

16. The method of claim 15, further comprising detecting, from the memory, a trigger of a read on the region in the memory, wherein the providing of the first message and the prefetching of the first data are performed in response to the detecting of the trigger.

17. The method of claim 15, wherein the providing of the first message comprises providing the first message to the host processor based on a first protocol, wherein the receiving of the second message comprises receiving the second message from the host processor based on a second protocol, and wherein the method further comprises receiving a third message for accessing the memory, from the host processor based on the second protocol.

18. The method of claim 15, wherein the prefetching of the first data comprises copying the first data from a lower-level memory included in the memory to a higher-level memory included in the memory.

19. The method of claim 15, wherein the prefetching of the first data comprises:
   reading the first data from the memory based on the address; and
   storing a copy of the first data in a buffer included in the device.

20. The method of claim 19, wherein the prefetching of the first data further comprises activating ready information when the copy of the first data is completely stored in the buffer, and
   wherein the method further comprises, when the second message is received, using the copy of the first data stored in the buffer or waiting for a reception of the first data from the memory, based on the ready information.

\* \* \* \* \*